3,294,205
FRICTION PAD SUPPORTING AND
RETRACTING DEVICE
Hans Schanz, Niederhochstadt, Taunus, Germany, assignor to Dunlop Rubber Company Limited, London, England, a corporation of Great Britain
Filed Aug. 28, 1964, Ser. No. 392,682
Claims priority, application Germany, Sept. 3, 1963, T 24,626
4 Claims. (Cl. 188—216)

This invention relates to disc brakes.

One object of the present invention is to provide a friction pad supporting and retracting device for a spot-type disc brake, the device according to the invention being particularly suitable for a brake of the kind in which the friction pads are carried on backing plates which are guided by pins extending axially at a location disposed beyond the disc periphery to slide axially relative to the disc.

According to the invention a spot-type disc brake of the kind in which at least one friction pad is carried on a backing plate slidably mounted on a guide extending parallel to the axis of rotation of the disc at a location disposed beyond a periphery thereof comprises a friction pad supporting and retracting device in the form of a sheet-metal spring carried on a non-rotatable support, a portion of the spring being bent to form a spring arm inclined relative to the axis of rotation of the disc and engaging the pad backing plate, said spring arm being stiffened by a lug formed from the remaining portion of the member and bent into engagement with the surface of the spring arm remote from the associated backing plate, the disposition of the arm being such that movement of the backing plate towards the disc sets up in the arm a reaction component tending to oppose movement of the associated friction pad towards the disc.

One embodiment of the invention will now be described with reference to the accompanying drawings in which.

Figure 1:
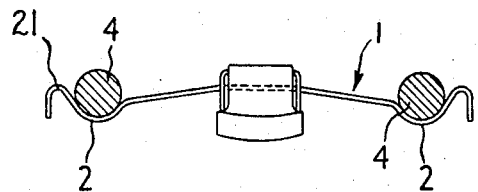
FIGURE 1 is a cross-sectional elevation of a friction pad supporting and retracting device, viewed in the axial direction of an associated disc.
Figure 2:
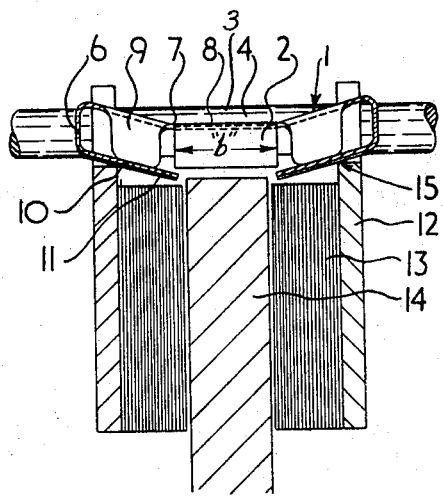
FIGURE 2 is a cross-sectional side elevation showing the supporting and retracting device in association with the friction elements, guides and disc.
Figure 3:
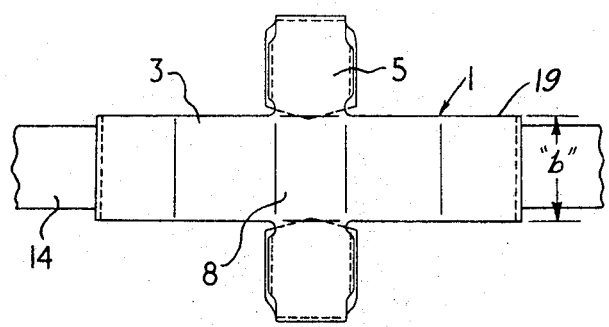
FIGURE 3 is a plan view of the supporting and retracting device.

The disc brake illustrated diagrammatically in the drawings comprises a sheet-metal spring 1 of generally cruciform shape as seen in FIGURE 3. The spring 1 is supported at the ends 2 of its longitudinal member 3 on supporting pins 4 fixed to a nonrotatable brake housing. The longitudinal member 3 extends in a direction at right angles to the axis of rotation of the associated disc adjacent the outer periphery thereof.

The transverse members 5 are formed with bends 6, and from the ends 7 of the bends 6, which are connected to the central or root portion 8 of the cruciform spring, lugs 9 are bent at right angles to the transverse members 5. The lugs 9 support, at their ends 10, the end portions 11 of the bends 6 which form spring arms inclined relative to the axis or rotation of the associated disc. The end portions 11 press against edges 15 of the backing plates 12 of the friction elements 13. The brake disc is designated by numeral 14.

The backing plates 12 are guided for axial movement towards and away from the brake disc 14 by the pins 4, and a brake applying mechanism of conventional form (not illustrated) is provided.

In operation, when the friction elements 13 are moved by the brake applying mechanism towards the brake disc 14, edges 15 of the backing plates 12 engage the end portions 11 and displace them radially outwardly. This displacement is transmitted to deform the whole cruciform spring elastically outwardly, since the end portions 11 are stiffened by the lugs 9.

The axial movement of the friction elements sets up reaction components in the end portions 11 which tend to press the backing plates 12 radially inwardly and axially outwardly, and on release of the pressure from the brake applying mechanism, the axially directed components of reaction tend to withdraw the friction elements 13 from rubbing contact with the disc 14.

The spring 1 also acts as an anti-rattle device since it serves to support the friction pad backing plates in a fixed radial position relative to the pins 4 which pass through clearance holes in the backing plates 12. The spring 1 presses the backing plates 12 radially inwardly to maintain firm contact between the pins 4 and the plates 12 at the outer edges of the clearance holes.

The longitudinal member 3 has a width "b" (FIG. 3) which is somewhat greater than the thickness of the brake disc 14, and thus when the friction pads are fully worn the backing plates 12 come into contact with the side edges 19 of the member 3 before contact is made with the disc, particularly at the edges 21, which are bent back for this purpose. Although the present invention has been illustrated and described in connection with the single example of the embodiment it will be understood that this is illustrative of the invention and is by on means restrictive thereof. It is reasonably to be assumed that those skilled in the art can make numerous revisions and adaptations of the invention to suit design requirements and it is intended that such revisions will be incorporated within the scope of the following claims as equivalents of the invention.

Having now described my invention, what I claim is:

1. In a disc brake having a rotatable disc and a pair of friction pads one on each side of said disc for engagement therewith, spaced guide means disposed at circumferentially spaced positions adjacent the periphery of said braking disc and having axially extending portions providing guide surfaces for said friction pads, and a combined supporting and retracting means for said friction pads in the form of a resilient member of a generally cruciform shape having one portion engaging said guide means to define the position of said member and limit its radially outward movement and another portion transverse to said first portion and including oppositely extending sections forming spring arms extending into engagement with said friction pads to effect supporting and retracting relation therewith.

2. The combination supporting and retracting means as defined in claim 1 wherein said axially extending portions include integral stiffening lugs for resisting distortion as the associated friction pad moves into engagement with its coacting opposed surfaces of the braking disc.

3. The combination supporting and retracting means in accordance with claim 1 wherein said one portion is disposed radially outwardly of said rotatable disc and is of greater width than the axial space between the opposite disc braking surfaces to position the spaced spring arms with the edges thereof in engagement with said friction pads to limit the movement of the respective friction pads into frictional engagement with said disc.

4. The combination supporting and retracting structure in accordance with claim 1 wherein said respective spring arms extend one on each of opposite sides of said rotor and are inclined downwardly at their projected ends toward the axis of rotation of the disc to effect a reaction component tending to oppose movement of the associated friction pads toward said disc.

References Cited by the Examiner
UNITED STATES PATENTS

| | | | |
|---|---|---|---|
| 2,862,581 | 12/1958 | Lucien | 188—73 |
| 3,154,175 | 10/1964 | Botterill et al. | 188—73 |
| 3,194,350 | 7/1965 | Soltis | 188—73 |

FERGUS S. MIDDLETON, *Primary Examiner.*

MILTON BUCHLER, *Examiner.*

G. E. A. HALVOSA, *Assistant Examiner.*